United States Patent
Bestmann

(10) Patent No.: US 9,626,604 B2
(45) Date of Patent: Apr. 18, 2017

(54) METHOD FOR DYNAMIC PRINTING PROCESS CALIBRATION

(71) Applicant: HEIDELBERGER DRUCKMASCHINEN AG, Heidelberg (DE)

(72) Inventor: Guenter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/817,541

(22) Filed: Aug. 4, 2015

(65) Prior Publication Data

US 2016/0034791 A1    Feb. 4, 2016

(30) Foreign Application Priority Data

Aug. 4, 2014    (DE) .................. 10 2014 011 664

(51) Int. Cl.
| | |
|---|---|
| *G06K 15/02* | (2006.01) |
| *G06K 15/00* | (2006.01) |
| *B41F 33/00* | (2006.01) |

(52) U.S. Cl.
CPC ........ *G06K 15/027* (2013.01); *B41F 33/0045* (2013.01); *G06K 15/005* (2013.01); *G06K 15/1878* (2013.01); *G06K 15/1881* (2013.01); *B41P 2233/10* (2013.01)

(58) Field of Classification Search
CPC ............. G06K 15/027; G06K 15/005; G06K 15/1878; G06K 15/1881; B41F 33/00; G01J 3/46

USPC .................................. 358/2.1, 1.9, 1.15
See application file for complete search history.

(56) References Cited

U.S. PATENT DOCUMENTS

| | | | |
|---|---|---|---|
| 5,636,330 A * | 6/1997 | Barak ............... | B41F 33/0027 358/1.1 |
| 8,810,857 B2 | 8/2014 | Bestmann | |
| 2005/0260013 A1 | 11/2005 | Vanlathem | |
| 2007/0199463 A1 | 8/2007 | Schonert | |
| 2014/0085647 A1* | 3/2014 | Hirano ............... | H04N 1/6027 358/1.9 |

FOREIGN PATENT DOCUMENTS

| | | |
|---|---|---|
| DE | 102004058801 A1 | 6/2006 |
| DE | 102005041181 A1 | 5/2007 |
| DE | 102009007864 A1 | 9/2009 |
| DE | 102011122932 B3 | 10/2013 |
| EP | 0518559 A1 | 12/1992 |
| JP | 2012209946 A | 10/2012 |

\* cited by examiner

*Primary Examiner* — Quang N Vo
(74) *Attorney, Agent, or Firm* — Laurence A. Greenberg; Werner H. Stemer; Ralph E. Locher

(57) ABSTRACT

A method for the dynamic printing process calibration of a printing press includes determining a calibration dataset for the colored halftones of the process colors, determining a calibration dataset for the gray halftones of the process colors, determining a weighting factor for the two calibration datasets as a function of the original print and calculating a combined calibration dataset from the two determined calibration datasets, with reference to the weighting factor. The calculated combined calibration dataset is applied to the calibration of the printing process of a printing press.

7 Claims, 3 Drawing Sheets

METHOD FOR DYNAMIC PRINTING PROCESS CALIBRATION

CROSS-REFERENCE TO RELATED APPLICATION

This application claims the priority, under 35 U.S.C. §119, of German patent application DE 10 2014 011 664.6, filed Au. 4, 2014; the prior application is herewith incorporated by reference in its entirety.

BACKGROUND OF THE INVENTION

Field of the Invention

The present invention relates to a method for dynamic printing process calibration.

The invention lies in the technical field of electronic reproduction technology.

In every printing process, the setting of color values must be calibrated at least once, before execution of a print job. That applies to all types of printing processes from classical offset printing to digital printing. The calibration itself can be carried out both manually and automatically. The principle of the calibration always remains the same, irrespective of the type of its implementation. In modern printing presses, however, it is usually carried out under computer control for reasons of efficiency.

To that end, various methods are known in the prior art. Some of them are disclosed in the technical specification ISO/TS 10128 "Graphic Technology—Methods of Adjustment of the Color Reproduction of a Printing System to Match a Set of Characterization Data." That describes methods for the calibration of conventional and digital printing processes using the four process colors cyan (C), magenta (M), yellow (Y) and black (K), CMYK for short. The three methods used therein are each based on adaptation of the tonal value gains, adaptation of the gray reproduction and an adaptation by using multi-dimensional transformation. The basis of all of the methods is the prior correct setting of the color loci of the four process colors. The aim of the methods is to match a predefined standard. This standard can be present in the form of reference values during the adaptation of the tonal value gain, of definitions during the adaptation of the gray reproduction, or expediently for all methods, by using characterization data.

The method of adapting the tonal value gain is distinguished by the following. Step wedges of the process colors are used as measuring elements for the calibration. A typical step wedge is the ECITVI10 control element from ECI (www.eci.org), which includes four step wedges with 10%, 20%, . . . , 100% halftone areas for the process colors. Furthermore, there are also areas for measuring the secondary colors (C+M, C+Y, M+Y, C+M+Y) and for measuring the paper white, a total of 45 color areas. By using that control element, both calibration of the tonal value gain and control of the coloring and tonal value gain are possible. Advantages of the method are the simplicity of the calculation of the adaptation, the small control element with 45 color areas and the very good adaptation of the tonal value reproduction of the process colors and the application in production. Disadvantages of the method are, under certain circumstances, depending on the printing material, the process colors and the settings of the printing press, the moderate to poor reproduction of the tonal values of the secondary colors for 2-color, 3-color and 4-color overprints, and in particular the gray reproduction. The latter can be corrected on the printing press by adapting the color values of the chromatic colors, but that is then at the cost of the tonal value gain. That method is, in particular, suitable for the reproduction of colored images and graphics.

The method of adapting the gray reproduction is in turn distinguished by the use of specific gray control elements of the chromatic printing inks and a step wedge for black. A typical control element is the P2P25 Target from IDEAlliance (www.idealliance.org), which includes seven gray control elements with 25 color areas and various step wedges. Furthermore, there are also areas for measuring the secondary colors and the paper white, a total of 300 color areas. Calibration of the gray reproduction and control of the coloring and specific gray areas are possible by using a subset of the control element with about 190 color areas. Advantages of the method are the very good adaptation of the gray reproduction and the black reproduction and the use in production. What are not so advantageous are the relatively large control element and the more complex calculation of the adaptation.

The disadvantages of the method are, under certain circumstances, once again depending on the printing material, the process colors and the settings of the printing press, the moderate to poor reproduction of the tonal values of the primary and secondary colors for 2-color, 3-color and 4-color overprints. Correction on the printing press is not possible. The method is, in particular, suitable for the reproduction of less colored, that is to say gray-toned, images and graphics.

Adaptation by using multi-dimensional transformation is known as a third method. In that case, use is made of targets according to ISO 12642-2 Graphic Technology "Input Data for Characterization of 4-Color Process Printing—Part 2: Expanded Data Set" with 1617 color areas which characterize the printable color space. Multidimensional transformation tables are calculated from those color areas. One example in that case is the profiles according to ISO 15076—"Image Technology Color Management—Architecture, Profile Format and Data Structure—Part 1: Based on ICC.1:2004-10", which include the appropriate transformation tables, for example in the Device Link Profiles. The advantage of the method is the very good adaptation of the entire reproducible color space. The disadvantage of the method is the very high outlay both during the determination of the characterization data and during the calculation of the transformation table and its application in production. The method has no significance nowadays in the conventional printing technology because of the high outlay. However, it is applied intensively in digital printing, since the outlay in that case with respect to the characterization is considerably lower. The method is suitable for the reproduction of all images and graphics.

All of those methods known from the prior art have advantages and disadvantages but they complement one another well. A combination of those methods for the optimal calibration of a printing process is therefore recommended. The difficulty is, for each printing process, to bundle a correct proportional combination of the known methods in one method and then to carry out the latter in such a way that a measurable gain in efficiency as compared with a basic serial application of all of the known methods is also produced.

SUMMARY OF THE INVENTION

It is accordingly an object of the invention to provide a method for dynamic printing process calibration of a printing press, which overcomes the hereinafore-mentioned disadvantages of the heretofore-known methods of this general type and which permits more efficient calibration than the previously known methods.

With the foregoing and other objects in view there is provided, in accordance with the invention, a method for dynamic printing process calibration for the color control of a printing process of a printing press, which comprises the following steps:

1. determining a calibration dataset for the colored halftones of the process colors;
2. determining a calibration dataset for the gray halftones of the process colors;
3. determining a weighting factor for the two calibration datasets as a function of the original print;
4. calculating a combined calibration dataset from the two determined calibration datasets, with reference to the weighting factor; and
5. applying the calculated combined calibration dataset to the calibration of the printing process of a printing press.

The decisive feature is the dynamic weighting of the two methods of the respective adaptation of the colored halftones and the gray reproduction. The weighting depends on the original print. In the case of a subject with a high proportion of color, the method of adapting the colored halftones will make up a higher proportion of the total method than the method of adapting the gray reproduction and vice versa in the case of a grayer subject.

In accordance with another preferred mode of the invention, the determination of the calibration dataset for the colored halftones of the process colors is done by measuring and evaluating at least one control element having colored halftones and adapting the halftones of the process colors while incorporating the measured results and a set of characterization data which describes the printing process.

The creation of the calibration dataset for the colored halftones is implemented by using the measurement and subsequent evaluation of a printed control element. In this case, the characterization data which, in standardized form, describes the printing process likewise has to be taken into account. The measurement is carried out in this case by recording the control elements by using a color sensor, with the measured data preferably being transmitted to a computer for evaluation, where the calibration dataset is then also created.

In accordance with a further preferred mode of the invention, the determination of the calibration dataset for the gray halftones of the process colors is done by measuring and evaluating at least one gray value control element and adapting the gray values of the process colors while incorporating the measured results and a set of characterization data which describes the printing process. The creation of the calibration dataset for the gray halftones, that is to say the gray reproduction, is carried out in a manner analogous to that for the colored halftones. However, use is made in this case of a control element with specific gray values, which is necessary for the calibration of the gray halftones.

In accordance with an added preferred mode of the invention, the weighting factor is determined by using an automatic analysis of the image content of the original print. Following the creation of the calibration datasets by the computer, it is necessary to determine the weighting factor, which determines the proportion of the calibration datasets for the colored and the gray halftones which respectively goes into the common calibration dataset. Since this weighting factor is oriented toward the image content of the subject, automatic analysis of the image content for the distribution of the gray and colored halftones is the preferred way of determining the weighting factor automatically by a computer.

In accordance with an additional preferred mode of the invention, the weighting factor is defined manually by a user.

Should an automatic definition of the weighting factor not be possible, this can also be defined manually by a user of the printing press. Manual re-correction of an automatically determined weighting factor is therefore also possible.

In accordance with yet another preferred mode of the invention, the weighting factor includes different values with a continuous transition for different halftone areas, depending on the image content of the original print.

If, in the subject, there are individual image areas which differ massively in terms of their gray/color value distribution, the weighting factor is adapted appropriately for these areas. In the transitions between these areas, the weighting factor is then also in the transition range.

In accordance with a concomitant preferred mode of the invention, in addition to the calibration datasets for the colored and gray halftones of the process colors, a further calibration dataset is created from multidimensional transformation tables, the weighting factor from this third calibration dataset is also included and the combined calibration dataset is calculated from all three calibration datasets that are present.

Since the method mentioned in the prior art for the adaptation by using multidimensional transformation can be applied practically only to the digital printing area, it is not a constituent part of the disclosed standard method. However, if a digital printing press is involved, then it can be integrated in the standard method. To this end, a third calibration dataset is created from multidimensional transformation tables and the weighting factor is expanded in such a way that it also covers the third calibration dataset. The joint calibration dataset is then created from all three partial calibration datasets that are present.

Other features which are considered as characteristic for the invention are set forth in the appended claims.

Although the invention is illustrated and described herein as embodied in a method for dynamic printing process calibration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The method and functionally advantageous developments of the method will be described in more detail below with reference to the associated drawings and by using at least one preferred exemplary embodiment. In the drawings, mutually corresponding elements are respectively provided with the same designations.

DETAILED DESCRIPTION OF THE INVENTION

Figure 1:
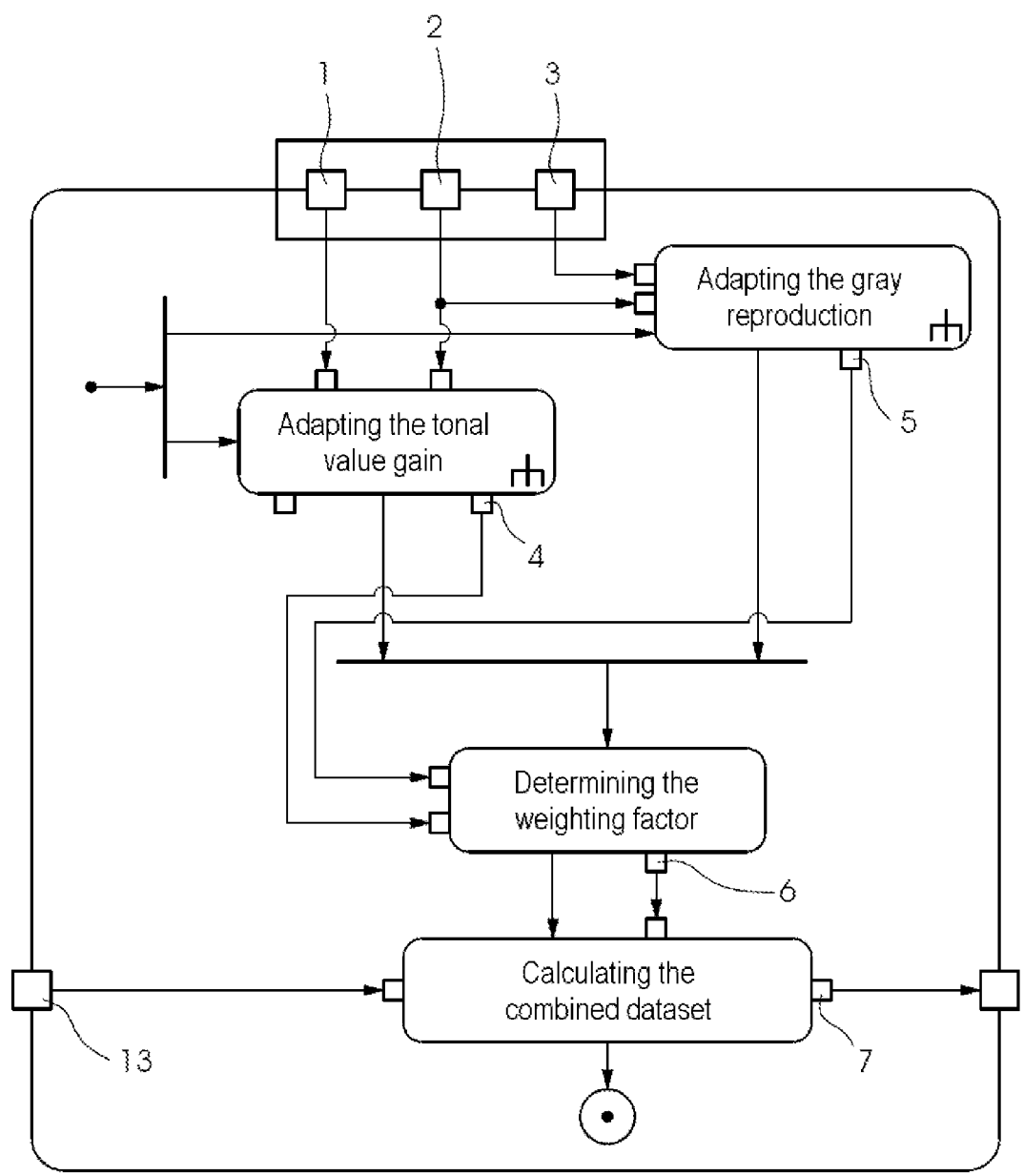
FIG. 1 is a flow diagram showing the basic sequence of the method according to the invention.
Figure 2:
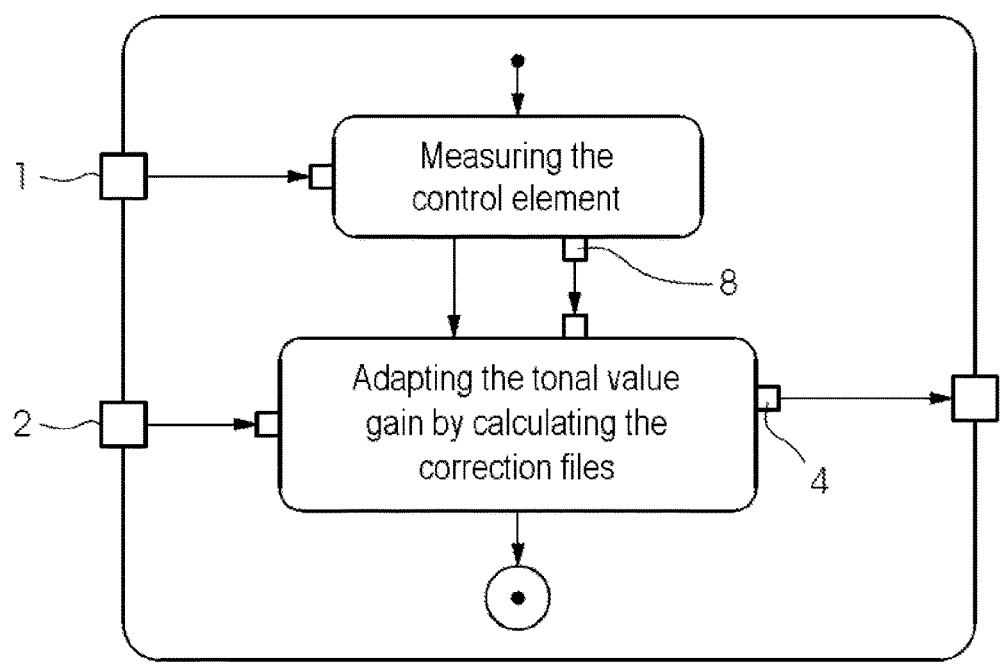
FIG. 2 is a flow diagram showing the sequence of adapting the colored tonal value gain.
Figure 3:
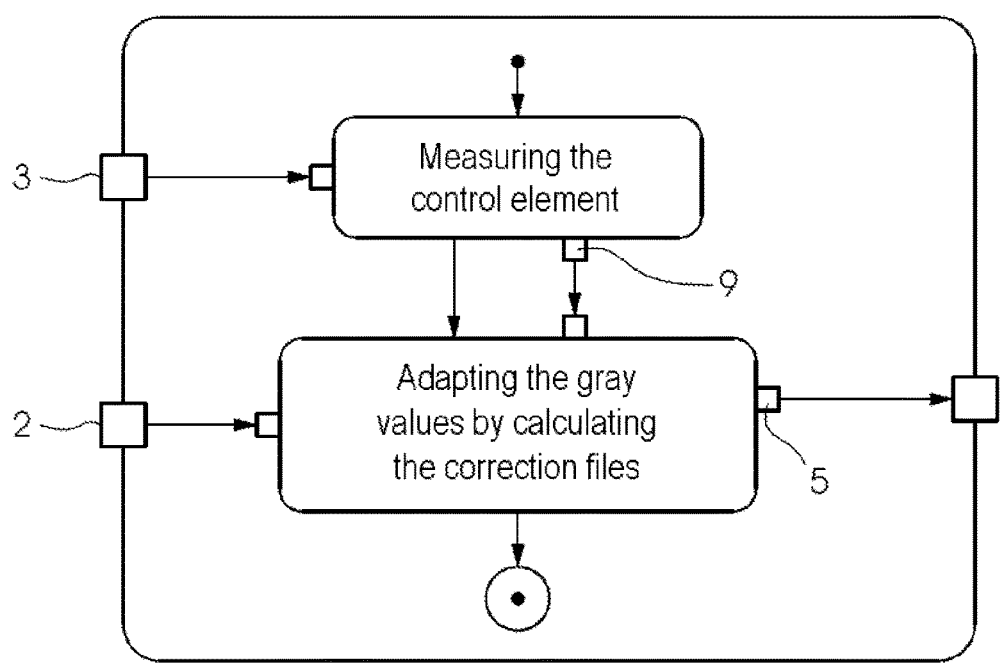
FIG. 3 is a flow diagram showing the sequence of adapting the gray value reproduction.

Referring now to the figures of the drawings in detail and first, particularly, to FIG. 1 thereof, there is seen a preferred embodiment variant of the method according to the invention. The preferred embodiment variant primarily includes a combination of two methods for adapting a colored tonal value gain and a gray reproduction. Both methods are carried out in a first step. They are illustrated in simplified form in FIGS. 2 and 3.

The adaptation of the tonal value gain and of the gray reproduction is carried out through 1-dimensional correction files in a raster image processor (RIP) during an exposure of printing plates. The correction files are generated by specialized programs which include both measured values of targets 8 and 9 and target values of the adaptation as input values. Preferred target values in the preferred embodiment are characterization data 2, which describes the printing process to be calibrated. Preferred measured values 8 and 9 are values from measured print control elements 1 and 3. In the method for adapting the colored tonal value gain, these are step wedges of the process colors. One example is the print control element for the colored halftones ECITVI10 1. In the method for adapting the gray reproduction, these are in turn specific gray control elements, such as the print control element P2P25 3. The calibration files are determined from the measured values and target values in accordance with both methods $D_{tvi}$ 4 and $D_{gray}$ 5 by using the common methods.

Two datasets 3 and 4 are thus present, from which a combined total calibration dataset $D_{tot}$ 7 is calculated, with the aid of a weighting factor f 6.

The weighting factor 6 is chosen as a function of the original to be printed, that is of the subject. If the subject is gray-toned, as is frequently the case in technical areas, a small value of f is chosen. If the subject is colored and has few to no gray tones, as is the case in landscape recording or portraits, a high value of f is chosen. The calculation of the weighting factor 6 can be made manually by the user or in the context of an automatic analysis of the original. In this case, the original print, which is in any case normally present in digital form, is analyzed by a program on a computer with respect to the distribution between colored and gray halftones. The weighting factor 6 is then determined by the program depending on the distribution. Manual re-correction of the automatically determined weighting factor 6 is also possible.

A factor of f=1.0 results in a pure colored tonal value gain adaptation, a factor f=0.0 in turn results in a pure gray reproduction adaptation, and a value between 1 and 0 results in a combined adaptation with different emphases.

The weighting factor 6 can be carried out as a function of halftone range in a further embodiment variant, which means that for different halftone ranges, different values with a continuous transition are provided. This makes sense, for example, if gray tones are present in the light area and more chromatic colors are present in the medium and darker lightness range.

Once the weighting factor 6 has been determined, a common dataset is calculated from the two individual calibration datasets $D_{tvi}$ 4 and $D_{gray}$ 5. This is done in accordance with the following formulae:

$$C_{new}[n]=f*C_{tvi}[n]+(1-f)*C_{gray}[n];$$

$$M_{new}[n]=f*M_{tvi}[n]+(1-f)*M_{gray}[n];$$

$$Y_{new}[n]=f*Y_{tvi}[n]+(1-f)*Y_{gray}[n];$$

$$K_{new}[n]=f*K_{tvi}[n]+(1-f)*K_{gra}Y[n].$$

Each dataset then includes the respective N correction values of the process colors CMYK. The combined correction values are the weighted mean of the individual correction values.

Figure 4:
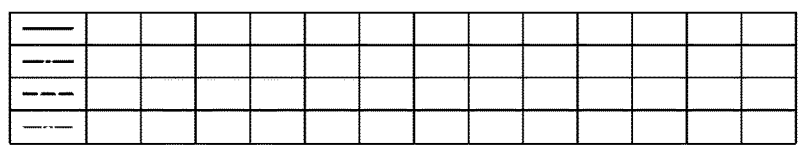
FIG. 4 is a diagram showing an example of a calibration dataset with a distribution of 0% colored tonal value gain to 100% gray value reproduction.
Figure 4:
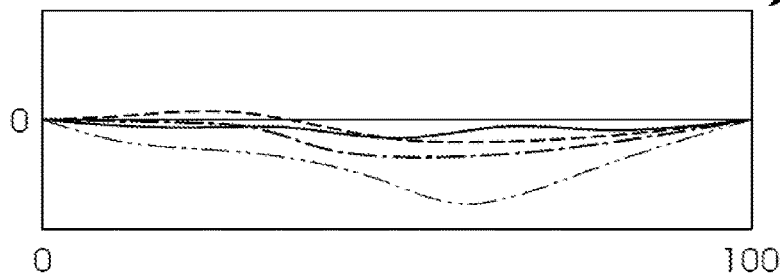
Figure 5:
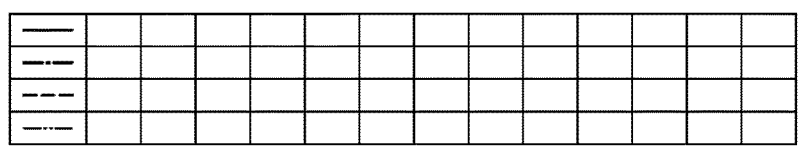
FIG. 5 is a diagram showing an example of a calibration dataset with a distribution of 50% colored tonal value gain to 50% gray value reproduction.
Figure 5:
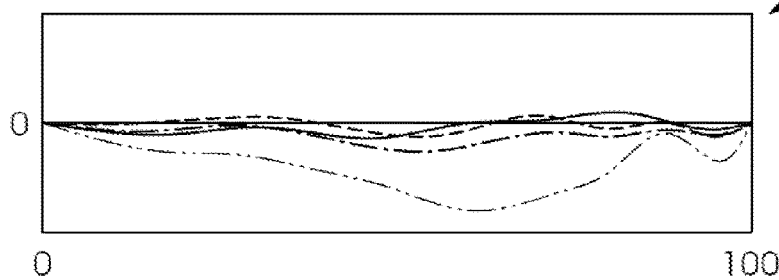
Figure 6:
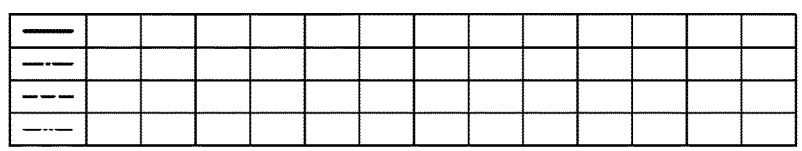
FIG. 6 is a diagram showing an example of a calibration dataset with a distribution of 100% colored tonal value gain to 0% gray value reproduction.
Figure 6:
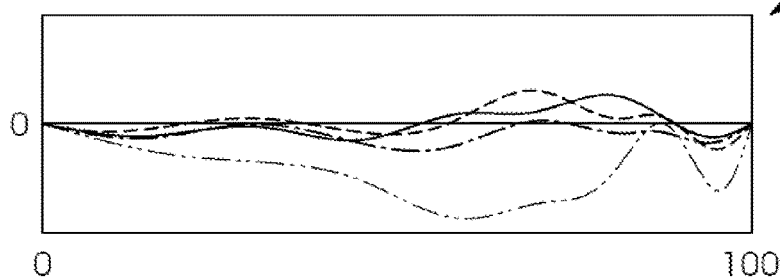

FIGS. 4, 5 and 6 show exemplary calibration datasets 10, 11 and 12. The measured value datasets 9 and 10 are produced in this case from a P2P25 Target 3, which contains both the needed information for the colored tonal value gain calibration and the gray balance calibration. The reference printing condition is a characterization dataset 2 for an offset printing process. In this case, FIG. 4 shows the calibration data and curves 10 by way of example for a pure calibration of the gray balance. The weighting factor 6 is thus f=0.0 in this case. In FIG. 5, in turn, mixed calibration data and curves 11 with an equivalent incorporation of the two partial datasets $D_{tvi}$ 4 and $D_{gray}$ 5 are shown. In this case, the weighting factor 6 is appropriately f=0.5. FIG. 6, finally, shows the calibration data and curves 12 for a pure calibration of the colored halftones. The weighting factor 6 is f=1.0.

In a last step, the printing process is then calibrated dynamically, i.e. adapted to the requirements arising from the original print, by using the calculated common calibration dataset $D_{tot}$ 7.

The invention claimed is:

1. A method for a dynamic printing process calibration of a printing press, the method comprising the following steps:
   determining a calibration dataset for colored halftones of process colors;
   determining a calibration dataset for gray halftones of the process colors;
   determining a weighting factor for the two calibration datasets as a function of an original print;
   calculating a combined calibration dataset from the two determined calibration datasets, with reference to the weighting factor; and
   applying the calculated combined calibration dataset to the calibration of the printing process of a printing press.

2. The method according to claim 1, which further comprises carrying out the determination of the calibration dataset for the colored halftones of the process colors by measuring and evaluating at least one control element having colored halftones and adapting the halftones of the process colors while incorporating measured results and a set of characterization data describing the printing process.

3. The method according to claim 1, which further comprises carrying out the determination of the calibration dataset for the gray halftones of the process colors by measuring and evaluating at least one gray value control element and adapting the gray values of the process colors while incorporating measured results and a set of characterization data describing the printing process.

4. The method according to claim 1, which further comprises determining the weighting factor by using an automatic analysis of image content of the original print.

5. The method according to claim 1, which further comprises defining the weighting factor manually by a user.

6. The method according to claim 1, wherein the weighting factor includes different values with a continuous transition for different halftone areas, depending on an image content of the original print.

7. The method according to claim 1, which further comprises:
- creating a third calibration dataset from multidimensional transformation tables, in addition to the calibration datasets for the colored and gray halftones of the process colors;
- including a weighting factor from the third calibration dataset; and
- calculating a combined calibration dataset from all three present calibration datasets.

* * * * *